D. H. MACE.
CONTROL APPARATUS.
APPLICATION FILED FEB. 3, 1915. RENEWED AUG. 29, 1916.
1,217,473.
Patented Feb. 27, 1917.
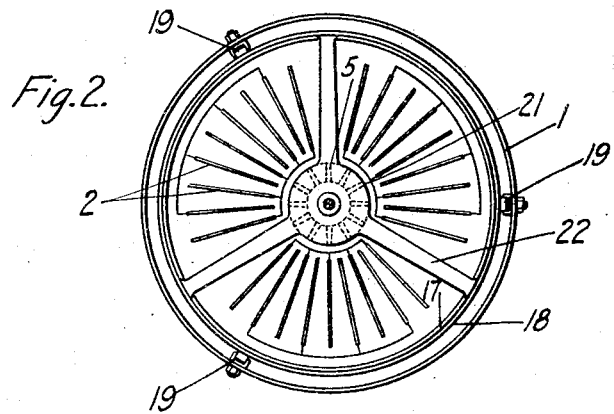
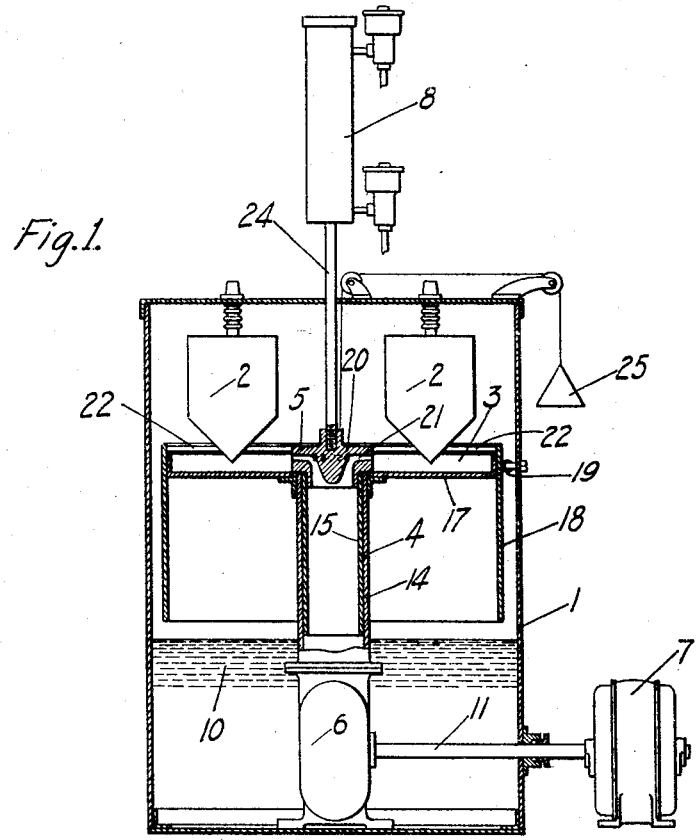
WITNESSES:
Chas. Formander
W. R. Coley
INVENTOR
Donald H. Mace.
BY
Wesley G. Carr
ATTORNEY

UNITED STATES PATENT OFFICE.

DONALD H. MACE, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

CONTROL APPARATUS.

1,217,473.     Specification of Letters Patent.     Patented Feb. 27, 1917.

Application filed February 3, 1915, Serial No. 5,890. Renewed August 29, 1916. Serial No. 117,562.

*To all whom it may concern:*

Be it known that I, DONALD H. MACE, a citizen of the United States, and a resident of Edgewood Park, in the county of Allegheny and State of Pennsylvania, have invented a new and useful Improvement in Control Apparatus, of which the following is a specification.

My invention relates to control apparatus, and it has special reference to liquid rheostats such as are adapted to control the operation of polyphase induction motors that are employed for propelling electric locomotives or other electric vehicles.

One of the objects of my invention is to improve and simplify the construction and operation of control devices of the above-indicated character, and to provide an apparatus that shall be particularly adapted for a continuous circulation of electrolyte.

Another object of my invention is to provide a liquid rheostat having stationary electrodes and an auxiliary electrolyte tank and embodying a peculiar arrangement of parts by means of which the electrodes may be gradually immersed in electrolyte which is continuously and rapidly supplied to the tank in a horizontal direction at substantially the surface of the body of electrolyte contained therein, whereby the hot surface electrolyte is violently agitated and carried away.

Heretofore, liquid rheostats of somewhat similar character have been employed, but, so far as I am aware, all such devices have received their continuous supply of electrolyte at a definite fixed inlet opening which usually is located near the bottom of the tank. In certain forms of rheostats, the electrolyte is allowed to rise to any desired height and is caused to overflow into an adjustable central tube, whereby the electrolyte level may be fixed as desired.

With this form of rheostat, there is, of course, a slight circulation or movement of the surface liquid, but this circulation is relatively small and entirely insufficient to carry away the hot electrolyte which accumulates at the top, and which it is desirable to discharge in order to maintain the apparatus within working temperatures and also to avoid impairing the efficiency and effectiveness thereof by reason of reducing the capacity of the apparatus to perform its intended functions.

According to my invention, I employ an auxiliary electrolyte container which shall be disposed above the main body of electrolyte within the rheostat, and shall comprise a stationary bottom partition and shell or side wall which incloses the partition and is adapted to be raised and lowered in position with respect thereto, whereby the depth of the container and, consequently, the height of the electrolyte in contact with the electrodes, is determined.

Moreover, I propose to continuously supply electrolyte to the container by means of a circulating pump through a telescopic central pipe having a set of radial nozzles associated with the upper end of its movable member. The inclosing shell and the set of nozzles are rigidly associated and adapted to be raised and lowered together by any suitable means. Thus, the electrolyte is supplied to the auxiliary container at substantially the surface of the electrolyte contained therein, whereby the hot surface electrolyte is forced outwardly between the electrodes and is caused to overflow the shell and be returned to the main tank.

My invention may best be understood by reference to the accompanying drawing, in which Figure 1 is a view, partially in side elevation and partially in section, of control apparatus constructed in accordance with my invention, and Fig. 2 is a plan view of a portion of the apparatus shown in Fig. 1.

Referring to the drawing, the apparatus shown comprises a main tank 1, a plurality of electrodes 2, an auxiliary electrolyte container 3, a telescopic supply pipe 4, a set of nozzles 5, a pump 6, a driving motor 7 and an operating device 8.

The main tank 1 is adapted to contain the main body of electrolyte 10 in which the pump 6 is submerged, said pump being of any well-known form and operated by the motor 7 which is located exterior to the tank 1. The motor 7 is associated with the pump 6 by means of a shaft 11. The tank 1 also serves to support the stationary electrodes 2 which are radially disposed and suspended therefrom in a suitable manner.

The telescopic pipe 4 comprises a stationary tubular member 14 that is supported upon the pump 6 and an inner relatively movable tubular member 15 which is adapted to be raised and lowered in position with respect thereto for a purpose to be hereinafter set forth.

The auxiliary electrolyte container 3 comprises a bottom wall 17 which is rigidly associated with, and supported by, the outer tubular member 14 of the telescopic pipe 4, and a cylindrical shell or side wall 18 that surrounds the bottom wall 17 and has a sliding engagement with the outer edge thereof, being adapted to be raised and lowered in position with respect thereto throughout the height of the electrodes 2. A plurality of rollers 19 serve as guides for the shell 18.

The set of nozzles 5 comprises a body member 20 that is fixed to the upper end of the movable tubular member 15 and is provided with a plurality of radially disposed horizontal openings or nozzles 21. The body member 20 of the set of nozzles 5 is mechanically associated with the movable shell 18 through the agency of a plurality of arms 22 and, hence, is adapted to be actuated therewith. The nozzles 21 are located just below the upper level of the shell 18 in such manner that the electrolyte delivered to the auxiliary container 3 is supplied thereto at substantially the surface level thereof, irrespective of the exact location of that level.

For convenience of operation, the operating device 8 comprises an electrically controlled pneumatic cylinder and a piston of well-known form which is operatively connected to the nozzle body member 20 through a rod 24. The movable parts of the apparatus are preferably counterbalanced by a weight 25.

Assuming the various parts of the apparatus to occupy the positions shown, and the motor 7 to be in operation and driving the circulating pump 6, the operation of the device is as follows:

Electrolyte is forced upwardly through the telescopic device 4 and is thence rapidly discharged radially outwardly in a substantially horizontal plane into the auxiliary electrolyte container 3 which, as shown, is of shallow depth. Having filled the container, the excess of electrolyte overflows the upper edge of the shell or side wall 18 and is thence returned to the bottom of the main tank 1. Inasmuch as the electrolyte is delivered under pressure, and at a rapid rate, at substantially the surface level of the body of electrolyte within the container, a violent outward circulation is effected which serves to carry away the hot electrolyte that normally accumulates at the top of the body. Under these conditions, merely the lower ends or tips of the electrodes 2 are immersed.

In order to increase the speed of the motor (not shown) which the rheostat is adapted to govern, the operating device 8 is manipulated to effect a gradual upward movement of the associated nozzles 5 and movable outer wall or shell 18. During this movement, the continuously supplied electrolyte gradually raises the level within the container 3 and finally establishes a level at a height corresponding to the upper edge of the movable shell 18, in whatever position it may occupy. If the moving parts of the container 3 and telescopic pipe 4 be raised gradually, as will be found desirable under operating conditions, the supply of electrolyte will be sufficient to effect a corresponding rise of the electrolyte in contact with the electrodes 2, and, during this action, the inflowing electrolyte will be projected into the body of electrolyte within the container in such manner as to continuously perform its intended function, as already set forth.

Although I have shown and described my invention as embodying more or less specific structural details and arrangement and location of parts, I desire that only such limitations shall be imposed as are indicated in the appended claims.

I claim as my invention:

1. In a liquid rheostat, the combination with a tank, a body of electrolyte contained therein, and stationary electrodes for said tank, of means for gradually raising the electrolyte in contact with said electrodes and continuously supplying electrolyte at substantially the surface of the body of raised electrolyte.

2. In a liquid rheostat, the combination with a tank, a body of electrolyte contained therein, and stationary electrodes for said tank, of means for gradually immersing said electrodes in electrolyte and causing the hot surface electrolyte to be rapidly carried away in a radial and outward direction.

3. In a liquid rheostat, the combination with a tank, a body of electrolyte contained therein, and stationary electrodes for said tank, of centrally disposed means for raising the electrolyte to immerse said electrodes and for continuously supplying the electrolyte at the surface of the raised electrolyte to effect a rapid radial flow of the hot surface electrolyte.

4. In a liquid rheostat, the combination with a tank, a body of electrolyte contained therein, and stationary electrodes for said tank, of means embodying a centrally disposed movable pipe and a plurality of radially disposed nozzles associated with its upper end for discharging electrolyte outwardly between said electrodes.

5. In a liquid rheostat, the combination with a tank, a body of electrolyte contained therein, and stationary electrodes for said tank, of a centrally located movable set of radially disposed nozzles adapted to be raised and lowered in position throughout the height of said electrodes and to discharge electrolyte between said electrodes.

6. In a liquid rheostat, the combination with a tank, a body of electrolyte contained therein, and stationary electrodes for said tank, of centrally located means adapted to be raised and lowered in position throughout the height of said electrodes for radially discharging electrolyte between said electrodes.

7. In a liquid rheostat, the combination with a tank, a body of electrolyte contained therein, and stationary electrodes for said tank, of a pump submerged in said electrolyte, a telescopic tubular member communicating with said pump and centrally located with respect to said electrodes, and a set of radially disposed nozzles associated with the upper end of said tubular member and adapted to be moved vertically relative to said electrodes and to radially discharge electrolyte between said electrodes.

8. In a liquid rheostat, the combination with a tank, a body of electrolyte contained therein, and a plurality of radially disposed electrodes, of a centrally located set of radially disposed nozzles for discharging electrolyte radially between said electrodes.

9. In a liquid rheostat, the combination with a tank, a body of electrolyte contained therein, a plurality of electrodes, a centrally located telescopic tube, means for forcing the electrolyte up through said tube, and a set of radial nozzles associated with the top of said tube, of a stationary horizontal partition above said body of electrolyte, a movable inclosing shell surrounding said partition to provide in conjunction therewith an electrolyte container of variable depth, and means for concurrently effecting vertical movements of said set of nozzles and said shell, whereby the electrolyte is delivered radially between said electrodes at the surface of the electrolyte within said container and overflows over said shell.

10. In a liquid rheostat, the combination with a tank, a body of electrolyte contained therein, and a plurality of electrodes, of an electrolyte-container of variable depth disposed above the body of electrolyte and comprising a stationary bottom member and a relatively movable inclosing shell having a sliding engagement with the edge thereof and adapted to be raised and lowered with respect to said electrodes to determine the degree of immersion thereof, and means for supplying electrolyte to said container.

11. In a liquid rheostat, the combination with a tank, a body of electrolyte contained therein, and a plurality of electrodes, of an electrolyte-container, of variable depth disposed above the body of electrolyte and comprising a stationary bottom member and a relatively movable inclosing shell having a sliding engagement with the edge thereof and adapted to be raised and lowered with respect to said electrodes to determine the degree of immersion thereof, a set of nozzles disposed at substantially the height of the upper edge of said shell and adapted to be moved concurrently therewith, and means for supplying electrolyte to said container through said nozzles, whereby the hot surface electrolyte rapidly overflows said shell.

12. In a liquid container, the combination with a stationary bottom wall and a movable inclosing shell adapted to make sliding engagement therewith and to be raised and lowered in position to vary the depth of said container, of means movable with said shell and located substantially at the top thereof for delivering a liquid into said container.

13. In a liquid rheostat, the combination with a main tank, a body of electrolyte contained therein, and a plurality of stationary electrodes, of an auxiliary electrolyte container disposed above said body of electrolyte, means for varying the depth of said container, and means for supplying electrolyte thereto.

14. In a liquid rheostat, the combination with a main tank, a body of electrolyte contained therein, and a plurality of stationary electrodes, of an auxiliary electrolyte container disposed above said body of electrolyte and comprising a stationary bottom wall and a relatively movable inclosing shell adapted to be raised and lowered to vary the depth of said container, and means for supplying electrolyte thereto.

15. In a liquid rheostat, the combination of a tank, a body of electrolyte contained therein and stationary electrodes for said tank, of centrally disposed means for discharging electrolyte outwardly between said electrodes.

16. In a liquid rheostat, the combination of a tank, a body of electrolyte contained therein and stationary electrodes for said tank, of centrally disposed means adapted to be raised and lowered in position for discharging electrolyte between said electrodes and at substantially the upper level of said electrolyte.

17. In a liquid rheostat, the combination with a containing tank, of a movable member for effecting a variation of liquid level therein, and means for producing the maximum continuous flow of liquid at the surface thereof throughout the range of travel of said movable member.

In testimony whereof, I have hereunto subscribed my name this 29th day of Jan. 1915.

DONALD H. MACE.

Witnesses:
W. R. COLEY,
B. B. HINES.

Copies of this patent may be obtained for five cents each, by addressing the "Commissioner of Patents, Washington, D. C."